(12) United States Patent
Hines, Jr. et al.

(10) Patent No.: US 7,470,411 B2
(45) Date of Patent: Dec. 30, 2008

(54) VAPORIZATION SYSTEM

(75) Inventors: Billy Daniel Hines, Jr., Wilmington, NC (US); Frank E. Beaty, III, Wilmington, NC (US); Glen Hayward Smith, Rocky Point, NC (US); John Francis Berger, Jr., Summerfield, NC (US); Marshall Graham Smith, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 757 days.

(21) Appl. No.: 11/035,139

(22) Filed: Jan. 13, 2005

(65) Prior Publication Data

US 2006/0151122 A1    Jul. 13, 2006

(51) Int. Cl.
*B01J 23/90* (2006.01)
(52) U.S. Cl. .................................. 422/224; 23/294 R
(58) Field of Classification Search ................ 422/224; 23/294 R
See application file for complete search history.

(56) References Cited

U.S. PATENT DOCUMENTS

| 1,307,999 | A | 6/1919 | Buckley |
| 1,831,644 | A | 11/1931 | Adair et al. |
| 3,922,112 | A | 11/1975 | Miscovich |
| 4,244,697 | A | 1/1981 | Vietzke et al. |
| 6,418,957 | B1 | 7/2002 | Goodyear |

*Primary Examiner*—Edward M Johnson
(74) *Attorney, Agent, or Firm*—Armstrong Teasdale LLP

(57) ABSTRACT

A method of operating a vaporization system including a first cylinder, a second cylinder, and an eductor having a suction inlet, a motive inlet, and an outlet is provided. The method includes vaporizing uranium hexaflouride in the first cylinder, channeling the vaporized uranium hexaflouride in the first cylinder to the suction inlet of the eductor, monitoring the pressure of the vaporized uranium hexaflouride channeled to the suction inlet, and channeling the vaporized uranium hexaflouride through the outlet. The method also includes vaporizing uranium hexaflouride in the second cylinder, and channeling the vaporized uranium hexaflouride in the second cylinder to the motive inlet of the eductor when the flow of uranium hexaflouride channeled to the suction inlet is below a predetermined amount.

14 Claims, 4 Drawing Sheets

VAPORIZATION SYSTEM

BACKGROUND OF THE INVENTION

This invention relates generally to vaporization systems, and more particularly, to methods and apparatus for operating vaporization systems.

Known conversion systems are utilized to process harmful or spent material into safe or useable material. At least some known conversion systems are utilized to process enriched uranium, or uranium hexafluoride (UF6) contained within transportation cylinders. These known systems include a vaporization system to heat and vaporize the material within the cylinders to a gas state. Once in the gas state, the material is channeled from the cylinders to a conversion reactor such that the material may be processed into a useable form.

At least some of these known vaporization systems include a first autoclave and a second autoclave for processing a first cylinder and a second cylinder, respectively. Additionally, a plurality of flow lines and flow valves are coupled to each autoclave for channeling the gas vapor to the conversion reactor. In operation of these known vaporization systems, the first cylinder is heated within the first autoclave and the material within the first cylinder is channeled through the vaporization system. A second cylinder is pre-heated and prepared for use. Once the flow and pressure from the first cylinder starts to decrease below a predetermined amount, the flow valves controlling the channeling of the vapor from the first cylinder are shut off. However, a small portion of the material remains in the flow lines and the first cylinder. As such, additional flow valves are opened to channel the remaining vapor in the first cylinder, also known as the heel, into a cold trap. Specifically, the cold trap operates at a temperature below the condensation temperature of UF6 and below the temperature of the first autoclave, and as such, a vacuum is created to channel the remaining vapor in the first cylinder to the cold trap. The cold trap process is operated until the first cylinder is empty. Once the first cylinder is empty, the first cylinder is removed from the first autoclave and is replaced with a new cylinder. While the remaining gas from the first cylinder is channeled to the cold trap, the flow valves for controlling the flow of the vapor from the second cylinder are opened. As such, the second cylinder is emptied in a similar manner as the gas from the first cylinder.

In these known vaporization systems, a continuous cycle of processing the uranium hexafluoride cylinders in the first autoclave and the second autoclave is performed until the cold trap is full. Once the cold trap is full, the cold trap is processed in a similar manner as the transportation cylinders in order to empty the cold trap. Specifically, the cold trap is heated and the material in the cold trap is vaporized. The vapor from the cold trap is channeled through a plurality of flow lines to the conversion reactor.

In these known vaporization systems, the conversion reactor receives zero flow of vapor as the system is switched over from processing the first autoclave to processing the second autoclave, and vice versa. Additionally, the conversion reactor receives zero flow of vapor as the system is switched over from processing the autoclaves to processing the cold trap. Specifically, it can take between a few minutes and a few hours to switch over between the different processes. As such, the conversion reactor is not utilized during this time. Additionally, in these known vaporization systems, the quality of product produced from the conversion process in the conversion reactor is varied due to the non-continuous flow of vaporized uranium hexafluoride. Specifically, the quality of product is affected by the pressure, flow rate, and concentration of uranium hexafluoride in the vapor. Each of these factors may be affected by the switch over of processing that occurs in known vaporization systems.

BRIEF DESCRIPTION OF THE INVENTION

In one aspect, a method of operating a vaporization system including a first cylinder, a second cylinder, and an eductor having a suction inlet, a motive inlet, and an outlet is provided. The method includes vaporizing uranium hexaflouride in the first cylinder, channeling the vaporized uranium hexaflouride in the first cylinder to the suction inlet of the eductor, monitoring the pressure of the vaporized uranium hexaflouride channeled to the suction inlet, and channeling the vaporized uranium hexaflouride through the outlet. The method also includes vaporizing uranium hexaflouride in the second cylinder, and channeling the vaporized uranium hexaflouride in the second cylinder to the motive inlet of the eductor when the flow of uranium hexaflouride channeled to the suction inlet is below a predetermined amount.

In another aspect, a vaporization system is provided. The vaporization system includes a first cylinder configured to store a predetermined amount of uranium hexaflouride therein, wherein the uranium hexaflouride is configured to be vaporized within the first cylinder, and a second cylinder configured to store a predetermined amount of uranium hexaflouride therein, wherein the uranium hexaflouride is configured to be vaporized within the second cylinder. The vaporization system also includes an eductor in flow communication with first supply lines extending between the first cylinder and the eductor, and second supply line 58s extending between the second cylinder and the eductor. The first supply lines are configured to channel vaporized uranium hexaflouride from the first cylinder to the eductor, and the second supply line 58s are configured to channel vaporized uranium hexaflouride from the second cylinder to the eductor. The vaporization system further includes a plurality of valves configured to control the flow of the vaporized uranium hexaflouride within the vaporization system.

In a further aspect, a vaporization system for channeling uranium hexaflouride from a cylinder is provided. The vaporization system includes a first cylinder configured to store a predetermined amount of uranium hexaflouride therein, wherein the uranium hexaflouride is configured to be vaporized within the first cylinder, and a second cylinder configured to store a predetermined amount of uranium hexaflouride therein, wherein the uranium hexaflouride is configured to be vaporized within the second cylinder. The vaporization system also includes an eductor in flow communication with the first and second cylinders, wherein the eductor includes a suction inlet, a motive inlet, and an outlet. The vaporization system further includes a suction flow controller for monitoring and controlling flow to the suction inlet, and a motive flow controller for monitoring and controlling flow to the motive inlet. The vaporization system also includes a plurality of first valves configured to control the flow of vaporized uranium hexaflouride from the first cylinder to at least one of the suction inlet and the motive inlet, a plurality of second valves configured to control the flow of vaporized uranium hexaflouride from the second cylinder to at least one of the suction inlet and the motive inlet, and a controller for controlling the flow of vaporized uranium hexaflouride from the first and second cylinders.

DETAILED DESCRIPTION OF THE INVENTION

Below described are methods and systems for processing harmful or spent uranium hexafluoride (UF6) material into safe or useable material. The methods and systems utilize a conversion reactor for processing the UF6 material. Specifically, the conversion reactor converts vaporized UF6 material into a solid powder. The vaporization systems described below provide advantages over known vaporization systems as the described systems provide a continuous, uniform flow of vaporized UF6 to the conversion reactor.

Figure 1:
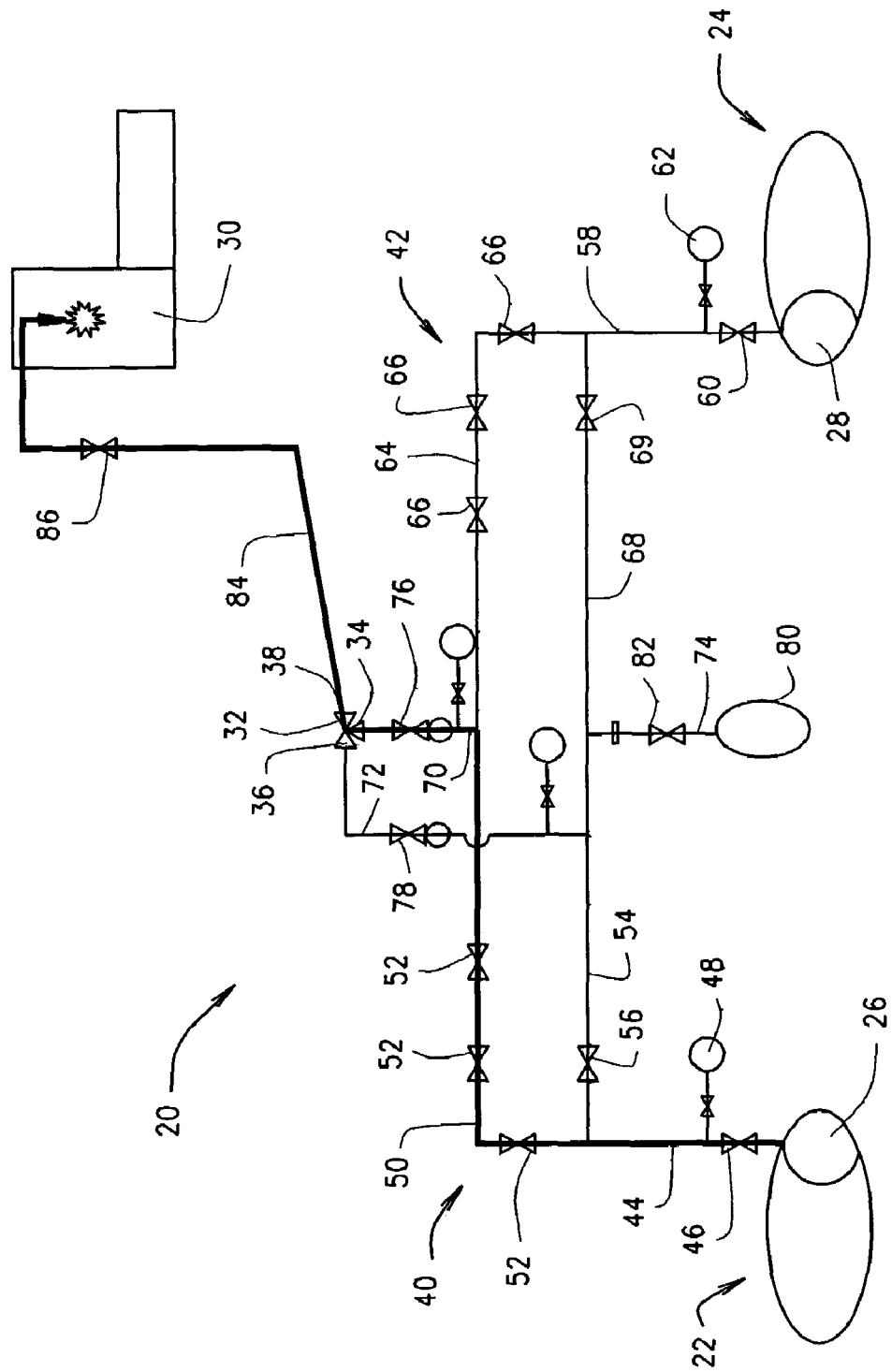
FIG. 1 is a schematic flow diagram of an exemplary vaporization system in one mode of operation.

FIG. 1 is a schematic flow diagram of an exemplary vaporization system 20 in one mode of operation. Vaporization system 20 includes a first autoclave 22 and a second autoclave 24. A source of UF6 material is placed within each autoclave 22 and 24 for processing. In the exemplary embodiment, the source of material is a transportation cylinder of UF6 material. Specifically, a first cylinder 26 is positioned within first autoclave 22 and a second cylinder 28 is positioned within second autoclave 24. First and second autoclaves 22 and 24 are utilized to heat first and second cylinders 26 and 28, respectively, such that the material contained within containers 26 and 28 is converted to a gaseous or vapor state. The vapor is then channeled through vaporization system 20 as described in detail below. Specifically, the vapor is channeled to a conversion reactor 30 where the vapor is processed into a useable material. Additionally, a controller (not shown) is operatively coupled to the various components of vaporization system 20 such that the controller controls the operations of the various components. As such, the various components may operate as a unitary system.

Vaporization system 20 includes an eductor 32. The vapor from first cylinder 26 and second cylinder 28 is channeled through eductor 32 to conversion reactor 30. In the exemplary embodiment, eductor 32 includes a suction inlet 34, a motive inlet 36, and an outlet 38.

Vaporization system 20 includes a first supply sub-system 40 and a second supply sub-system 42. First supply sub-system 40 supplies vapor flow from first cylinder 26 to eductor 32. Second supply sub-system 42 supplies vapor flow from second cylinder 28 to eductor 32.

First supply sub-system 40 includes a first supply line 44 coupled in flow communication with first cylinder 26. In the exemplary embodiment, a first supply line flow valve 46 is coupled to first supply line 44. Flow valve 46 controls the flow of vapor in first supply line 44. In the exemplary embodiment, flow valve 46 is operatively coupled to the controller. In one embodiment, a pressure gauge 48 is coupled to first supply line 44 for monitoring the pressure of the vapor in first supply line 44. First supply sub-system 40 also includes a first suction supply line 50 coupled in flow communication with first supply line 44. In the exemplary embodiment, at least one first suction supply line flow valve 52 is coupled to first suction supply line 50. Flow valve 52 controls the flow of vapor in first suction supply line 50. In the exemplary embodiment, flow valve 52 is operatively coupled to the controller. First supply sub-system 40 also includes a first motive supply line 54 coupled in flow communication with first supply line 44. In the exemplary embodiment, at least one first motive supply line flow valve 56 is coupled to first motive supply line 54. Flow valve 56 controls the flow of vapor in first motive supply line 54. In the exemplary embodiment, flow valve 56 is operatively coupled to the controller.

Second supply sub-system 42 includes a second supply line 58 coupled in flow communication with second cylinder 28. In the exemplary embodiment, a second supply line flow valve 60 is coupled to second supply line 58. Flow valve 60 controls the flow of vapor in second supply line 58. In the exemplary embodiment, flow valve 60 is operatively coupled to the controller. In one embodiment, a pressure gauge 62 is coupled to second supply line 58 for monitoring the pressure of the vapor in second supply line 58. Second supply sub-system 42 also includes a second suction supply line 64 coupled in flow communication with second supply line 58. In the exemplary embodiment, at least one second suction supply line flow valve 66 is coupled to second suction supply line 64. Flow valve 66 controls the flow of vapor in second suction supply line 64. In the exemplary embodiment, flow valve 66 is operatively coupled to the controller. Second supply sub-system 42 also includes a second motive supply line 68 coupled in flow communication with second supply line 58. In the exemplary embodiment, at least one second motive supply line flow valve 69 is coupled to second motive supply line 68. Flow valve 69 controls the flow of vapor in second motive supply line 68. In the exemplary embodiment, flow valve 69 is operatively coupled to the controller.

In the exemplary embodiment, first and second supply sub-systems 40 and 42 include a plurality of common supply lines. Specifically, first and second supply sub-systems 40 and 42 include a common suction supply line 70 and a common motive supply line 72. In one embodiment, first and second supply sub-systems 40 and 42 also include a common cold trap line 74.

Common suction supply line 70 is in flow communication with first and second suction supply lines 50 and 64. Additionally, common suction supply line 70 is in flow communication with eductor suction inlet 34. As such, vapor gas may flow from first cylinder 26 through first supply line 44, first suction supply line 50, common suction supply line 70 and into eductor 32 through suction inlet 34. Additionally, vapor gas may flow from second cylinder 28 through second supply line 58, second suction supply line 64, common suction supply line 70 and into eductor 32 through suction inlet 34. In the exemplary embodiment, a common suction supply line flow controller 76 is coupled to common suction supply line 70. Flow controller 76 monitors and controls the flow and/or pressure of vapor in common suction supply line 70. In the exemplary embodiment, flow controller 76 is operatively coupled to the controller.

Common motive supply line 72 is in flow communication with first and second motive supply lines 54 and 68. Additionally, common motive supply line 72 is in flow communication with eductor motive inlet 36. As such, vapor gas may flow from first cylinder 26 through first supply line 44, first motive supply line 54, common motive supply line 72 and into eductor 32 through motive inlet 36. Additionally, vapor gas may flow from second cylinder 28 through second supply line 58, second motive supply line 68, common motive supply line 72 and into eductor 32 through motive inlet 36. In the exemplary embodiment, a common motive supply line flow controller 78 is coupled to common motive supply line 72. Flow controller 78 monitors and controls the flow and/or pressure of vapor in common motive supply line 72. In the exemplary embodiment, flow controller 78 is operatively coupled to the controller.

In one embodiment, vaporization system 20 includes a cold trap 80. Cold trap 80 facilitates collecting vapor therein for storage. Cold trap 80 operates at a lower temperature than first or second autoclave 22 or 24. As such, the lower temperature creates a vacuum for channeling vapor from first or second cylinders 26 or 28. In one embodiment common cold trap line 74 is in flow communication with cold trap 80. Additionally, common cold trap line 74 is in flow communication with both first and second supply sub-systems 40 and 42. Specifically, common cold trap line 74 is in flow communication with first motive supply line 54 and second motive supply line 68 such that vapor from first and second cylinders 26 and 28, respectively, may be channeled into cold trap 80. In an alternative embodiment, common cold trap line 74 is in flow communication with first and second supply line 58s. In another alternative embodiment, common cold trap line 74 is in flow communication with first suction supply line 50 and second suction supply line 64. A cold trap line flow valve 82 is coupled to common cold trap line 74. Flow valve 82 controls the flow of vapor in common cold trap line 74.

In an alternative embodiment, first and second supply sub-systems 40 and 42 do not include any common lines. Rather, first suction supply line 50 is directly coupled to eductor 32 and second supply line 58 is directly coupled to eductor 32. Additionally, first motive supply line 54 is directly coupled to eductor 32 and second motive supply line 68 is directly coupled to eductor 32. In one embodiment, first and second suction supply lines 50 and 64 are coupled to suction inlet 34, and first and second motive supply lines 54 and 68 are coupled to motive inlet 36. In an alternative embodiment, first suction supply line 50 is coupled to a first suction inlet (not shown), first motive supply line 54 is coupled to a first motive inlet (not shown), second suction supply line 64 is coupled to a second suction inlet (not shown), and second suction supply line 64 is coupled to a second suction inlet (not shown).

In the exemplary embodiment, outlet 38 is coupled to an outlet line 84 extending between eductor 32 and conversion reactor 30. As such, conversion reactor 30 is in flow communication with first and second cylinders 26 and 28 via outlet line 84. In one embodiment, outlet line 84 includes an outlet line flow valve 86 for controlling the flow of vapor through outlet line flow valve 86. In the exemplary embodiment, flow valve 86 is operatively coupled to the controller.

In operation, vapor from first and second cylinders 26 and 28 is channeled through vaporization system 20 to conversion reactor 30. In the mode of operation illustrated in FIG. 1, vapor from first cylinder 26 is channeled to conversion reactor 30. Specifically, first autoclave 22 heats first cylinder 26 to a predetermined temperature to convert the material in first cylinder 26 to a vapor. In the exemplary embodiment, first supply line flow valve 46 is in the open position to allow vapor flow through first supply line 44, and first suction supply line 50 valve is in the open position to allow vapor flow through first suction supply line 50. First motive supply line 54 is in the closed position such that vapor is not allowed to flow through first motive supply line 54. Additionally, flow valves 60, 66, and 69 associated with second supply sub-system 42 are closed such that vapor from second cylinder 28 is not allowed to flow to eductor 32. Moreover, suction supply line flow controller 76 is monitoring the flow of vapor through common suction supply line 70 and is oriented to allow a predetermined flow rate of vapor through common suction supply line 70 to eductor 32.

During operation, vapor from first cylinder 26 is continuously channeled to eductor 32. Additionally, flow controller 76 is continuously monitoring the flow rate and the pressure of the vapor, and allows a continuous, uniform flow of vapor to eductor 32. In one embodiment, flow controller 76 allows a flow rate of approximately one hundred kilograms per hour, however, the flow rate may be more or less than approximately one hundred kilograms per hour depending on the application. The vapor is channeled from eductor 32, through outlet line 84, to conversion reactor 30. However, as the amount of material in first cylinder 26 is continuously decreased, the pressure of the vapor channeled to flow controller 76 is also decreased. Once the pressure reaches a predetermined level, additional vapor must be supplied to eductor 32 to facilitate maintaining a continuous, uniform flow of vapor to conversion reactor 30. As such, the controller alters the mode of operation of vaporization system 20 and supplies the UF6 to maintain the flow rate to conversion reactor 30 from second cylinder 28, as described below in more detail. In one embodiment, vapor from first cylinder 26 is channeled to conversion reactor 30 for between approximately twenty and thirty hours before the mode of operation is altered.

Figure 2:
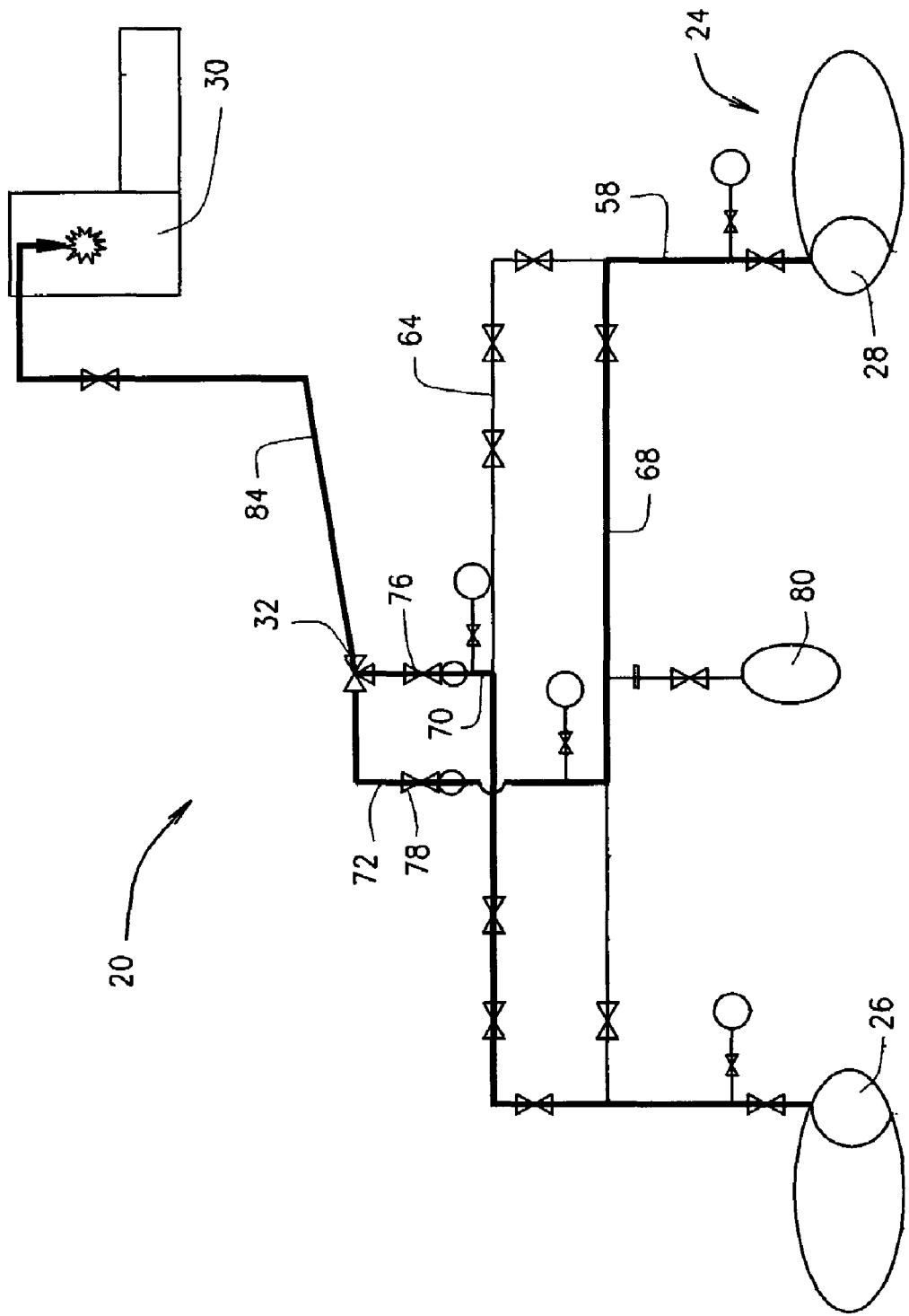
FIG. 2 is a schematic flow diagram of the vaporization system illustrated in FIG. 1 in another mode of operation.

FIG. 2 is a schematic flow diagram of vaporization system 20 in an altered mode of operation. In the mode of operation illustrated in FIG. 2, vapor from both first and second cylinders 26 and 28 is channeled to conversion reactor 30. Specifically, first cylinder 26 continues to channel vapor to eductor 32 as described above, and eductor 32 creates a vacuum on common suction supply line 70 such that substantially all of the material in first cylinder 26 is evacuated from first cylinder 26, thus eliminating the need for cold trap 80. Additionally, vapor is continuously supplied to conversion reactor 30 thus eliminating conversion reactor 30 down time.

In operation, second autoclave 24 heats second cylinder 28 to a predetermined temperature to convert the material in second cylinder 28 to a vapor. In the exemplary embodiment, second cylinder 28 is pre-heated prior to the decrease in pressure of the vapor in first cylinder 26. Specifically, when the pressure in common suction supply line flow controller 76 is at a predetermined amount, the controller signals second autoclave 24 to begin pre-heating second cylinder 28. In one embodiment, second cylinder 28 is pre-heated for between approximately ten and fifteen hours.

In the exemplary embodiment, second supply line 58 flow valve is in the open position to allow vapor flow through second supply line 58, and second motive supply line 68 valve is in the open position to allow vapor flow through second motive supply line 68. Second suction supply line 64 is in the closed position such that vapor is not allowed to flow through second suction supply line 64. As such, vapor is channeled through second supply line 58, second motive supply line 68, and common motive supply line 72 to eductor 32 where the vapor from second cylinder 28 is combined with the vapor from first cylinder 26. The combined vapor is channeled from eductor 32, through outlet line 84, to conversion reactor 30. In one embodiment, the combined flow rate is approximately one hundred kilograms per hour, however, the flow rate may be more or less than approximately one hundred kilograms per hour depending on the application.

Suction and motive supply line flow controllers 76 and 78 are each monitoring the flow of vapor through respective common suction and motive supply lines 70 and 72. In the exemplary embodiment, motive supply line flow controller 78 is oriented to allow a predetermined flow rate of vapor through common motive supply line 72 to eductor 32. Specifically, as the pressure and/or flow rate of the vapor channeled through common suction supply line 70 from first cylinder 26 is decreased, the pressure and/or flow rate of the vapor channeled through common motive supply line 72 from second cylinder 28 is increased by a corresponding amount. As such, a continuous, uniform pressure and flow rate of vapor is channeled to eductor 32 and conversion reactor 30.

Additionally, as the flow rate from common motive supply line 72 is increased the vacuum created on common suction supply line 70 is also increased. As such, substantially all of the vapor from first cylinder 26 is evacuated through eductor 32. Once flow controller 76 determines that the flow rate is below a predetermined amount, such as, for example, approximately zero kilograms per hour, the controller alters the mode of operation of vaporization system 20, as described below in more detail.

Figure 3:
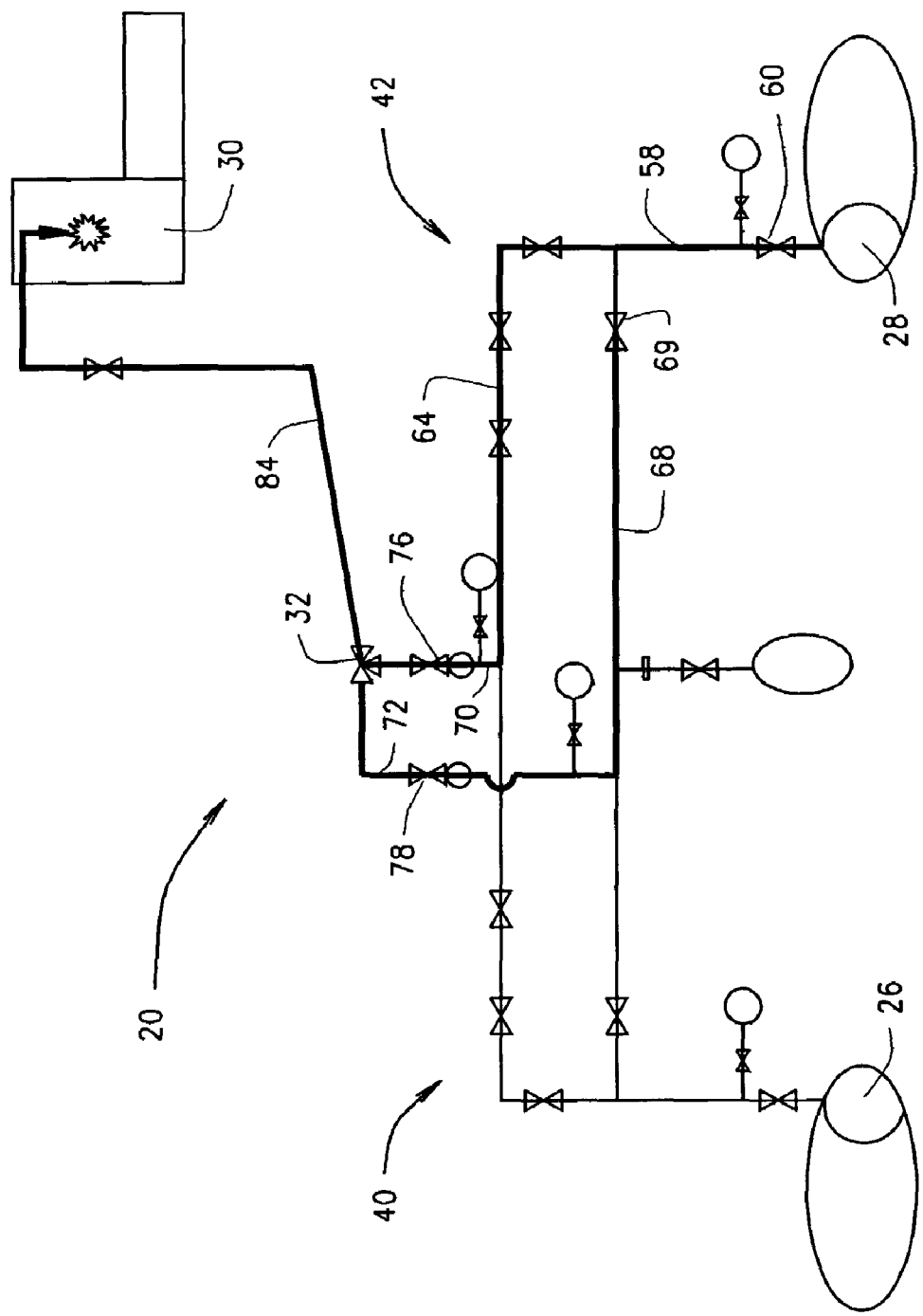
FIG. 3 is a schematic flow diagram of the vaporization system illustrated in FIG. 1 in a further mode of operation.

FIG. 3 is a schematic flow diagram of vaporization system 20 in another altered mode of operation. In the mode of operation illustrated in FIG. 3, vapor from second cylinder 28 is channeled to conversion reactor 30. Second supply line flow valve 60 and second motive supply line flow valve 69 are still in the open position to allow vapor flow through second motive supply line 68. Additionally, second suction supply line 64 is transferred to the open position such that vapor is also allowed to flow through second suction supply line 64 to common suction supply line 70. Additionally, flow valves associated with first supply sub-system 40 are closed such that vapor from first cylinder 26 is not allowed to flow to eductor 32. As such, vapor is channeled through second supply line 58, second motive supply line 68, common motive supply line 72, second suction supply line 64, and common suction supply line 70 to eductor 32. The vapor from common motive supply line 72 and common suction supply line 70 is combined in eductor 32 and the combined vapor is channeled from eductor 32, through outlet line 84, to conversion reactor 30. In one embodiment, the combined flow rate is approximately one hundred kilograms per hour, however, the flow rate may be more or less than approximately one hundred kilograms per hour depending on the application.

In operation, the flow rates in motive and suction supply lines 72 and 70 may be altered by respective flow controllers 78 and 76. Specifically, in the exemplary embodiment, the combined flow rates of flow controllers 76 and 78 remains constant such that the flow rate to eductor 32 and conversion reactor 30 is continuous and uniform. As such, in the mode of operation illustrated in FIG. 3, the flow rate in flow controller 78 is gradually decreased and the flow rate in flow controller 76 is gradually increased, while maintaining a constant combined flow rate. Once flow controller 78 determines that the flow rate is below a predetermined amount, such as, for example, approximately zero kilograms per hour, the controller alters the mode of operation of vaporization system 20, as described below in more detail.

Figure 4:
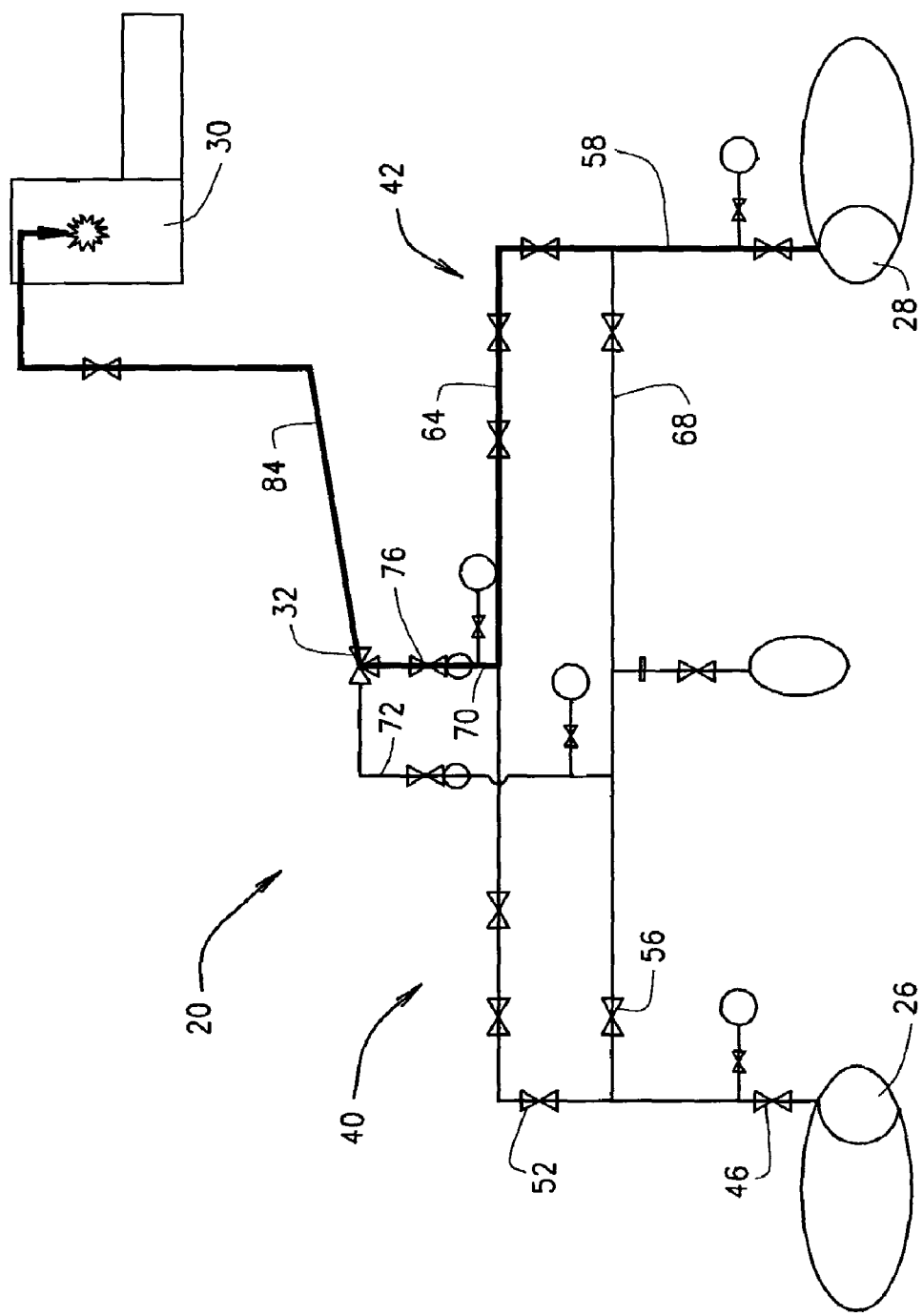
FIG. 4 is a schematic flow diagram of the vaporization system illustrated in FIG. 1 in yet another mode of operation.

FIG. 4 is a schematic flow diagram of vaporization system 20 in a further altered mode of operation. In the mode of operation illustrated in FIG. 4, vapor from second cylinder 28 is channeled to conversion reactor 30. In the exemplary embodiment, second supply line 58 flow valve is in the open position to allow vapor flow through second supply line 58, and second suction supply line 64 valve is in the open position to allow vapor flow through second suction supply line 64. Second motive supply line 68 is in the closed position such that vapor is not allowed to flow through second motive supply line 68. Additionally, flow valves 46, 52, and 56 associated with first supply sub-system 40 are closed such that vapor from first cylinder 26 is not allowed to flow to eductor 32. Moreover, suction supply line flow controller 76 is monitoring the flow of vapor through common suction supply line 70 and is oriented to allow a predetermined flow rate of vapor through common suction supply line 70 to eductor 32.

During operation, vapor from second cylinder 28 is continuously channeled to eductor 32. Additionally, flow controller 76 is continuously monitoring the flow rate and the pressure of the vapor, and allows a continuous, uniform flow of vapor to eductor 32. In one embodiment, flow controller 76 allows a flow rate of approximately one hundred kilograms per hour, however, the flow rate may be more or less than approximately one hundred kilograms per hour depending on the application. The vapor is channeled from eductor 32, through outlet line 84, to conversion reactor 30.

In the mode of operation illustrated in FIG. 4, vaporization system 20 operates in a substantially similar manner as vaporization system 20 operated in the mode of operation illustrated in FIG. 1, however vaporization system 20 is channeling vapor from second cylinder 28 as opposed to first cylinder 26. As such, vaporization system 20 is operated to channel the vapor in second cylinder 28 to conversion reactor 30. As the amount of material in second cylinder 28 is continuously decreased, the pressure of the vapor channeled to flow controller 76 is also decreased. Once the pressure reaches a predetermined level, additional vapor must be supplied to eductor 32 to facilitate maintaining a continuous, uniform flow of vapor to conversion reactor 30. As such, the controller alters the mode of operation of vaporization system 20 and provides a demand from first cylinder 26.

The above-described vaporization system for channeling uranium hexaflouride from a cylinder operates in a cost-effective and reliable manner. The vaporization system includes an eductor having a suction inlet and a motive inlet. The vaporization system also includes first and second autoclaves for processing first and second cylinders of uranium hexafluoride. The cylinders are each in flow communication with the suction inlet and the motive inlet. The cylinders are alternatingly processed by vaporization system such that a continuous uniform flow of vapor material is supplied to a conversion reactor. Specifically, a plurality of valves are coupled along flow lines of the ventilation system to control the flow of vapor through the vaporization system. As the first cylinder is emptied into the suction inlet of the eductor, and the flow rate from the first cylinder decreases below a predetermined level, the second cylinder is processed, and the vapor from the second cylinder is channeled to the motive inlet of the eductor. As the flow rate of the vapor channeled through the motive inlet is increased, a vacuum is created at the suction inlet and the remaining portion of the vapor in the first cylinder is evacuated. As such, a continuous flow of vapor may be channeled to the conversion reactor, thus reducing a lag time, or down time of the conversion process and increasing the overall system responsiveness. As a result, the vaporization system facilitates providing a continuous and uniform flow of vapor material to the conversion reactor, thus increasing an amount of useable product produced by the conversion process in the conversion reactor.

Exemplary embodiments of vaporization systems and methods are described above in detail. The systems and methods are not limited to the specific embodiments described herein, but rather, components of each system may be utilized independently and separately from other components described herein, and steps in the methods may be utilized independently and separately from other steps described herein.

While the invention has been described in terms of various specific embodiments, those skilled in the art will recognize that the invention can be practiced with modification within the spirit and scope of the claims.

What is claimed is:

1. A vaporization system comprising:
   a first cylinder configured to store a predetermined amount of uranium hexaflouride therein, wherein the uranium hexaflouride is configured to be vaporized within said first cylinder;

a second cylinder configured to store a predetermined amount of uranium hexaflouride therein, wherein the uranium hexaflouride is configured to be vaporized within said second cylinder;

an eductor in flow communication with first supply lines extending between said first cylinder and said eductor, and second supply line extending between said second cylinder and said eductor, said first supply lines configured to channel vaporized uranium hexaflouride from said first cylinder to said eductor, and said second supply line configured to channel vaporized uranium hexaflouride from said second cylinder to said eductor; and a plurality of valves configured to control the flow of the vaporized uranium hexaflouride within said vaporization system.

2. A vaporization system in accordance with claim 1 further comprising a conversion reactor for processing the vaporized uranium hexaflouride, said conversion reactor in flow communication with said eductor via an outlet line.

3. A vaporization system in accordance with claim 1 wherein one of said first and second supply line is configured to operate as a suction line and an opposing one of said first and second supply line is configured to operate as a motive line.

4. A vaporization system in accordance with claim 1 wherein said plurality of valves comprises at least one flow controller coupled to said first supply lines for controlling flow of vaporized uranium hexafluoride to said eductor, and at least one flow controller coupled to said second supply line for controlling flow of vaporized uranium hexafluoride to said eductor.

5. A vaporization system in accordance with claim 1 wherein said eductor includes a suction inlet and a motive inlet, said first supply lines configured to channel vaporized uranium hexafluoride to said supply inlet and said motive inlet, said second supply line configured to channel vaporized uranium hexafluoride to said supply inlet and said motive inlet, said plurality of valves configured to control flow of the vaporized uranium hexafluoride from said first and second cylinders to said suction inlet and said motive inlet.

6. A vaporization system in accordance with claim 1 wherein said eductor includes a suction inlet, a motive inlet and an outlet, said eductor configured to receive vaporized uranium hexaflouride from one of said first cylinder and said second cylinder through said suction inlet, said eductor configured to receive vaporized uranium hexaflouride from an opposing one of said first cylinder and said second cylinder through said motive inlet, said eductor configured to channel a combined flow of vaporized uranium hexaflouride through said outlet.

7. A vaporization system in accordance with claim 1 wherein said eductor includes a suction inlet, a motive inlet and an outlet, said plurality of valves configured to control the flow of vaporized uranium hexaflouride from one of said first cylinders and said second cylinder through said suction inlet, said plurality of valves configured to control the flow of vaporized uranium hexaflouride from an opposing one of said first cylinders and said second cylinder through said motive inlet, said eductor configured to channel a combined flow of vaporized uranium hexaflouride through said outlet.

8. A vaporization system in accordance with claim 1 wherein said eductor includes a suction inlet, a motive inlet and an outlet, said eductor configured to receive vaporized uranium hexaflouride from one of said first cylinder and said second cylinder through both of said suction inlet and said motive inlet, said eductor configured to channel a combined flow of vaporized uranium hexaflouride through said outlet.

9. A vaporization system in accordance with claim 1 wherein said eductor includes a suction inlet, a motive inlet and an outlet, said eductor configured to receive vaporized uranium hexaflouride from one of said first cylinder and said second cylinder through said suction inlet, said eductor configured to receive vaporized uranium hexaflouride from an opposing one of said first cylinder and said second cylinder through said motive inlet, said eductor configured to receive vaporized uranium hexaflouride at said suction inlet at a first pressure, and said eductor configured to receive vaporized uranium hexaflouride at said motive inlet at a second pressure, wherein said first pressure is lower than said second pressure.

10. A vaporization system in accordance with claim 1 wherein said eductor includes a suction inlet, a motive inlet and an outlet, said eductor is configured to receive a continuous supply of vaporized uranium hexafluoride from at least one of said first and second cylinders through at least one of said suction inlet and said motive inlet, said eductor is configured to channel a continuous flow of vaporized uranium hexafluoride through said outlet.

11. A vaporization system in accordance with claim 1 wherein said vaporization system facilitates channeling a continuous supply of vaporized uranium hexafluoride to a conversion reactor.

12. A vaporization system in accordance with claim 1 wherein said vaporization system facilitates channeling a heel portion of the vaporized uranium hexafluoride from at least one of said first and second cylinders to a conversion reactor.

13. A vaporization system for channeling uranium hexafiouride from a cylinder, said vaporization system comprising:

a first cylinder configured to store a predetermined amount of uranium hexaflouride therein, wherein the uranium hexaflouride is configured to be vaporized within said first cylinder;

a second cylinder configured to store a predetermined amount of uranium hexaflouride therein, wherein the uranium hexaflouride is configured to be vaporized within said second cylinder;

an eductor in flow communication with said first and second cylinders, said eductor comprising a suction inlet, a motive inlet, and an outlet;

a suction flow controller for monitoring and controlling flow to said suction inlet;

a motive flow controller for monitoring and controlling flow to said motive inlet;

a plurality of first valves configured to control the flow of vaporized uranium hexaflouride from said first cylinder to at least one of said suction inlet and said motive inlet;

a plurality of second valves configured to control the flow of vaporized uranium hexaflouride from said second cylinder to at least one of said suction inlet and said motive inlet; and a controller for controlling the flow of vaporized uranium hexaflouride from said first and second cylinders.

14. A vaporization system in accordance with claim 13 wherein said controller is configured to control flow of vaporized uranium hexaflouride from one of said first cylinder and said second cylinder to said motive inlet when the flow through said suction flow controller is below a predetermined amount, such that a vacuum is created for the vaporized uranium hexafluoride channeled through said suction inlet.

* * * * *